United States Patent [19]

Gordon

[11] Patent Number: 4,982,700
[45] Date of Patent: Jan. 8, 1991

[54] FERRET HARNESS

[76] Inventor: Richard A. Gordon, 95 W. 3rd St., Freeport, N.Y. 11520

[21] Appl. No.: 221,714

[22] Filed: Jul. 20, 1988

[51] Int. Cl.$^5$ .............................................. A01K 29/00
[52] U.S. Cl. ......................................... 119/96; 24/170
[58] Field of Search ................. 119/96, 106, 126, 101; 24/168, 169, 170

[56] References Cited

U.S. PATENT DOCUMENTS

| | | | |
|---|---|---|---|
| 632,793 | 9/1899 | Sell et al. | 24/170 |
| 2,804,092 | 8/1957 | Aitchison | 24/170 X |
| 3,310,034 | 3/1967 | Dishart | 119/106 X |
| 4,384,548 | 5/1983 | Cohn | 119/106 X |
| 4,787,340 | 11/1988 | Kirtley | 119/106 |

Primary Examiner—Robert P. Swiatek
Attorney, Agent, or Firm—Bauer & Schaffer

[57] ABSTRACT

Opposite ends of an elongated body encircling member lie over each other when disposed in the mode of use on the body of an animal and a fastener member made up of a flexible clevis-shaped hasp and a flanged lever secure the ends together. The clevis shaped hasp has a slotted base and spaced, inverted, generally U-shaped side members forming a U-shaped channels in which the flanged lever is located. When the opposite ends of the elongated body member are disposed in the fastener over the slot of the hasp and between the U-shaped side members and the flange of the lever is applied against them by rotating it, the ends are locked in the hasp and cannot pull apart.

7 Claims, 1 Drawing Sheet

U.S. Patent  Jan. 8, 1991  4,982,700
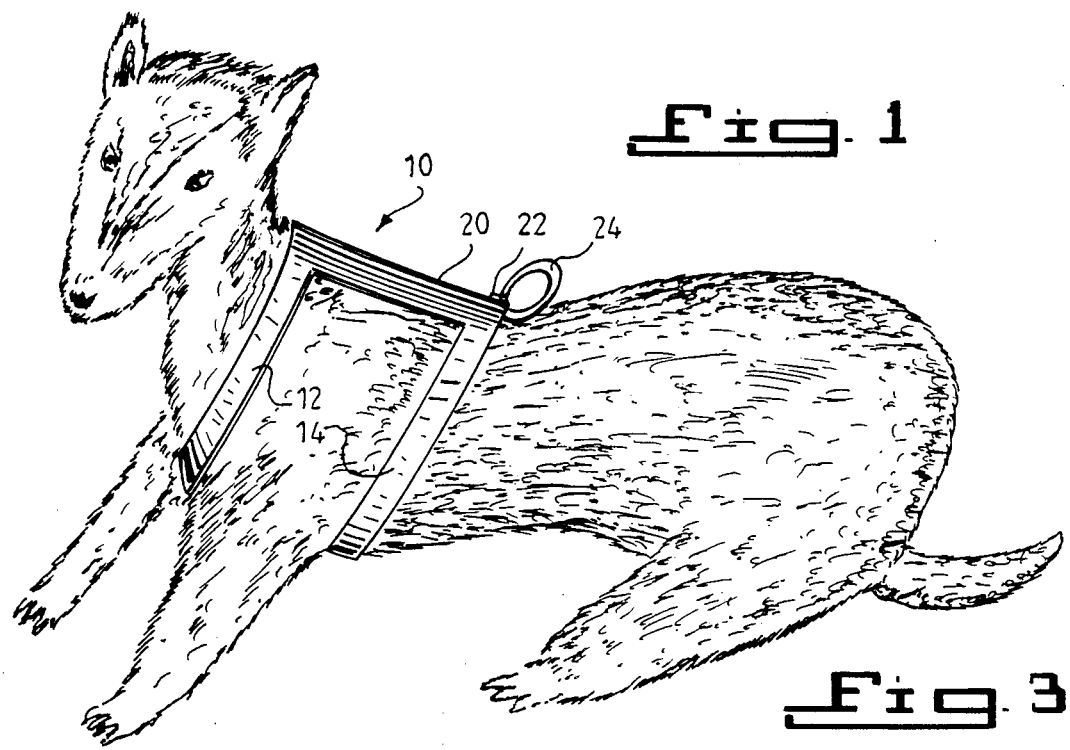
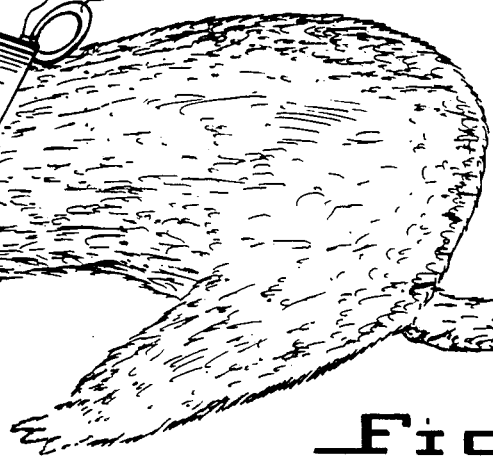
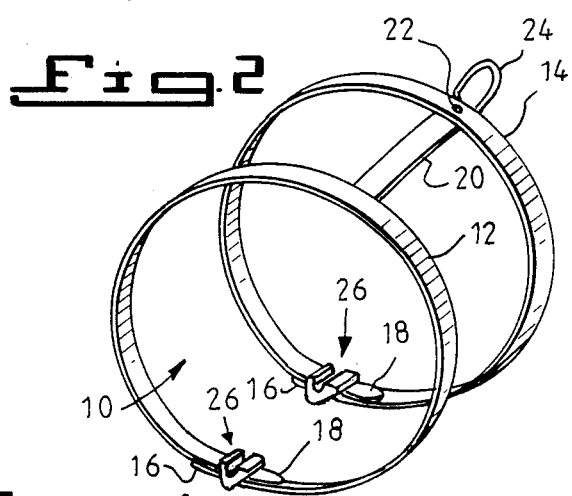
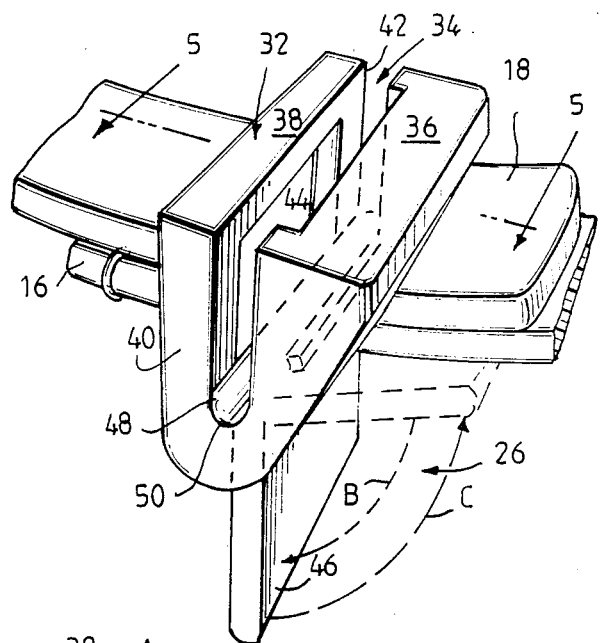
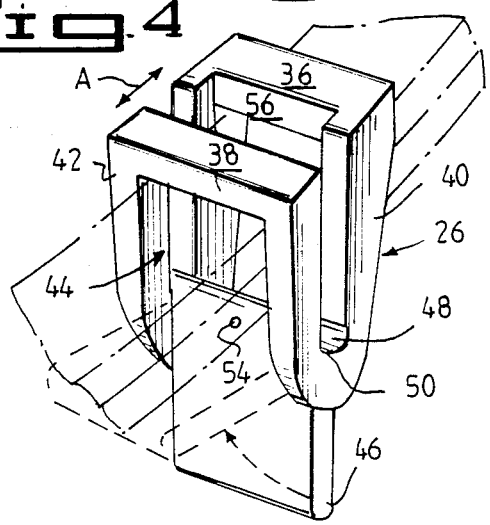
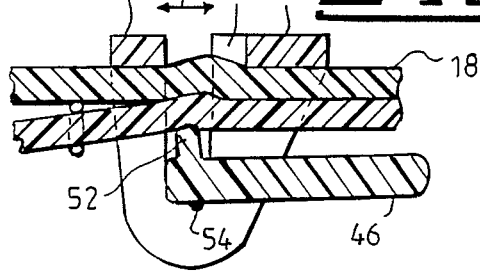

FERRET HARNESS

BACKGROUND OF THE INVENTION

The present invention relates to an animal restraint and more particularly, to an animal halter having an improved fastening member for use on small animals, such as ferrets, guinea pigs, dogs, cats and the like of small or light stature, although it can be constructed in varying sizes, as needed, and also used on large animals.

A wide variety of animal restraints are known, such as collars, halters and body harnesses which are generally employed with a lead or tether in order to restrain an animal. Moreover, such restraints usually include in combination with the straps or body encircling members, one of a wide variety of devices for fastening the end portions of body encircling members thereof, such as a buckle which generally includes a hook member and a helping or counter member. Fastening means such as Velcro strips have also been tried by applying such strip to the facing surfaces of the end portions of straps to fasten and join the same when the restraint is disposed in its mode of use.

While the known restraints, provided with buckles and/or Velcro strips, serve well in accomplishing their intended end result, especially with small animals, they are not fully satisfactory. The buckles are difficult to close, particularly on an unruly animal and often snag the animal's hair or skin. They are also highly breakable. The Velcro strips tend to lose their ability to cohere to each other after a long period of time particularly when wet or dirt encrusted. Consequently such restraints have limited useful life and there exists a need for the provision of improved harness constructions which do not exhibit these disadvantageous aspect. The present invention fulfills this need.

BRIEF STATEMENT OF THE INVENTION

In accordance with the present invention there is provided an animal restraint comprising in combination, at least one elongated body encircling member including a main body encircling portion disposed between opposite end portions which lie over each other when the harness is disposed in its mode of use on the body of an animal, and at least one fastener member comprising a clevis-shaped hasp and a flanged lever disposed on the elongated body encircling member. The clevis-shaped hasp comprises a slotted base having spaced, generally inverted U-shaped side members disposed thereon which form a channel traverse to the slotted base into which the strap ends are inserted. The flanged lever is rotatably seated within U-shaped walls in contact with the ends of the straps which are thus capable of being squeezed and bent by the flanged lever when the flanged lever is rotated so that the strap ends are secured against the base, locking the ends in the fastener.

In order to understand the present invention more fully, reference is directed to the accompanying drawings taken in conjunction with the following detailed description of the invention.

IN THE DRAWINGS

FIG. 1 is a perspective view of an animal restraint according to the invention disposed on an animal, such as a ferret;

FIG. 2 is a perspective view of the restraint showing the fasteners of the present invention, in situ, as if disposed on the animal;

FIG. 3 is a perspective view, in exploded side elevation of a fastening member according to the invention showing the disposition of the hasp and flanged lever making up the fastener with respect to each other, as well as the slotted base members of the hasp;

FIG. 4 is a front perspective view in elevation of the fastener shown in FIG. 3;

FIG. 5 is a side view, partially sectioned, taken along line 5—5 of FIG. 3 showing the fastening member from the opposite side of FIG. 3.

DESCRIPTION OF THE PREFERRED EMBODIMENTS

Referring initially to FIG. 1, the animal restraint comprising a halter type harness generally depicted by the numeral 10, is formed of a pair of elongated body encircling straps 12 and 14, each having opposite ends 16 and 18. The body encircling straps 12 and 14 are joined to each other by a connecting strap 20 disposed approximately midway of the ends 16 and 18 and substantially perpendicular to the elongated body encircling straps 12 and 14 such that all are co-planar in the flattened condition, providing an enlarged H form.

The straps 12, 14 and 20 may be made from molded plastic, such as polyethylene, polyurethane and the like, so as to be flexible but not stretchable. The connector strap 20 can be molded integrally with the straps 12 and 14, or, as illustrated, can be molded integrally with one encircling strap 12 and affixed to the other encircling strap 14 by a rivet 22, or the like. A ring or other loop shaped member 24 attached to the connector 20 or the strap 14 for the purpose of attaching a suitable lead or tether (not shown) thereto. Alternately, the harness 10 may be fashioned or stamped, if desired, from one or more pieces of leather or the like, and assembled as shown. Molded plastics are generally less expensive and lend themselves more readily to simple and less expensive mass production techniques.

As will be seen from FIG. 2, the harness 10 is provided with an improved fastener, generally depicted by the numeral 26 to secure the respective ends 16 and 18 of each of the body encircling straps 12 and 14 together. The improved fastener member, 26 as seen in detail in FIGS. 3, 4 and 5, comprises a clevis-shaped hasp 30 formed of a base generally depicted by the numeral 32 having a slot 34 formed therein providing right and left base portions 36 and 38 (as seen in FIG. 3) and a pair of inverted U-shaped walls 40 and 42, spaced from each other on opposite sides of the base 32 to form therebetween, a channel 44 transverse to the slot 34. Although the slot 34 severs the base 32 into its two base portions 36 and 38, the base portions are fixed held and spaced resiliently apart by being integrally attached to the U-shaped walls 40 and 42.

Located within the U-shaped walls is a tab like lever 46 having laterally extending shoulders 48 which seat against the inner surface of the closed apices 50 of the U-shaped walls 40 and 42 allowing the lever to rotate substantially 180 degrees. The lever 46 is provided with a flange 52 disposed on one face along the edge adjacent the position of the shoulders 48. The opposite face of the lever 46 is provided with a small pip 54. Both the hasp 30 and lever 46 may be made of any suitable plastic such as nylon, polyethylene, polyurethane, etc., or metal, or combinations of metal and plastic. The hasp 30 should however, be made of material that permit the walls 40 and 42 to be relatively moveable so that the base portions 36 and 38 move with respect to each other as shown by the arrows A in FIGS. 4 and 5.

In general, the lever 46 is separately formed and inserted into the slot 34, with the flange 52 facing the inner edge of the right base portion 36 as seen in full lines in FIG. 3. To this end, that portion of the base is provided with a notch 56 to permit passage of the flange 52. The pip 54 on the opposite side, prevents the inadvertent removal or loss of the lever 46 by co-acting with the edge of the opposite or left portion 40 of base 32.

As may be seen from FIGS. 3 and 5, the fastener 26, when disposed in its mode of use around the body of an animal, permits the end portions 16 and 18 of body encircling straps 12 and 14 to be both inserted through the channel windows 44 in overlaying relationship. The insertion of the strap ends 16 and 18 is facilitated by rotating lever 46 clockwise (solid lines) as shown by arrow B in FIG. 3, into an inoperative position where the flange 52 is not within the confines of the channel 44. Thereafter lever 54 is rotated in the opposite direction (dotted lines as shown by arrow C) to move the flange 52 to the operative position in the channel 44 bearing against the overlaying end portions 16 and 18. In the operative position, the flange 52 compresses the ends 16 and 18 together against the lowermost edge of the base portions 36 and 38. This causes the material of the strap ends to bulge and bend into the space of slot 34 being pinched between the base portions 36 and 38 as seen in FIG. 5. Due to the cooperation of slot 34 and the pressure of the flange 52, both straps 16 and 18 are squeezed together and bent to be securely locked in place. In addition, due to the flexibility of walls 40 and 42, the pressure of base postions 36 and 38 on the straps continues even when rotation of the lever 48 is ended. This locks the lever into the operating position. Still further, any attempt to pull the straps axially apart only serves to make them more tightly held in the manner of the ancient Chinese "Finger or hand cuffs".

To prevent the fastener 26 from falling off the strap during non use of the restraint, the fastener is first put on one strap, (strap 18 as seen in the drawings) which strap is then provided, exterior of the fastener, with a retaining ring 58 which is held by friction or by being pinched tightly on the strap. Preferably the retainer ring 58 is placed on the strap which is to be placed in channel 44 first and closest to the base 32 (i.e. out of direct contact with the flange 52 of the lever 46). In this manner, the retaining ring also bears on the other strap 16 and forces the strap 18 to which it is fixed into contact with the base 32, increasing its holding power.

It is to be understood, that it is within the purview of this invention, that the restraint be a collar rather than a harness and that a single fastener 26 may be employed with a single body encircling strap, thus forming the collar and omitting the connector 20 as well. Velcro strips may if desired, be fixed to the end portions 16 of body encircling straps at one end and like Velcro strips (not shown) fixed to the underside of the opposite end portions 18 so that when the body encircling members are disposed in their mode of use around the body of an animal, the strips will face and contact each other and thus fasten the end portions securely around the body of the animal preventing them from disturbing the animal. Preferably however, the ends of the straps will be cut, by scissor, to the size and shape of the animal in use.

Numerous variations of the present invention may be made without departing from the spirit and scope of the invention as desired in detail herein. It is to be understood, therefore, that the invention is not to be limited to the described embodiment, except as defined in the appended claims.

What is claimed is:

1. An animal restraint comprising in combination, at least one body encircling member having opposite end portions which lie over each other when said restraint is disposed in its mode of use on the body of an animal, and at least one fastener member comprising a clevis-shaped hasp and a flanged lever, said clevis-shaped hasp comprising a base having a central slot and a pair of inverted, generally U-shaped side walls laterally spaced thereon to form a channel transverse to the slot in the base, a notch formed in one side of said base adjacent the slot therein and communicating with said transverse channel, said flanged lever having a substantially rectangular body with inner and outer ends and planar surfaces, the inner end of said body having rounded shoulders extending laterally from the side edges thereof to seat within the U-shaped walls, said flanged lever having a rigid locking flange extending perpendicularly from one planar surface transversely of said lever, the inner end of said lever and said locking flange being insertable through the slot in the base and notch respectively so that the round shoulders are rotatably seated within said U-shaped walls whereby the outer end of said lever extends through said channel and the locking flange is directed toward said base so that on insertion of said opposite end portions in said channel between said lever and said base, said flanged lever is rotatable between a first position permitting free movement of said overlying opposite end portions and a second position in which said overlying opposite end portions are squeezed and bent by the locking flange on said lever against the base to secure the opposite end portions of said overlying encircling members together.

2. The restraint according to claim 1, including at least one additional elongated body encircling member and at least an additional fastener member, said at least one additional body encircling member being attached to the other elongated body encircling member by an elongated connector disposed substantially perpendicular to said at least one additional elongated body encircling member and said other elongated body encircling member.

3. The restraint according to claim 1, wherein the lever includes an extending pip located thereon on the side opposite the flange, said pip cooperating with the base to prevent inadvertent dislodgement of said lever from said base.

4. The restraint according to claim 1, wherein the fastener member is made of plastic material and the clevis-shaped hasp is flexible in a longitudinal direction with respect to the opposite end portions.

5. A harness according to claim 1, wherein the plastic material is selected from nylon, polyethylene and polyurethane.

6. An animal restraint as set forth in claim 1, having a retaining ring pinch fit about said body encircling member, so that the fastener is prevented from sliding off the body encircling member, said retaining ring being positioned immediately adjacent to said fastener when fastened so that said retaining ring bears upon the opposite end portions and the base of fastener, whereby compression of said opposite end portions is increased.

7. An animal harness comprising in combination, a pair of elongated body encircling straps, each elongated body encircling strap having a pair of opposite end portions, and a retaining ring pinch fit about one of the opposite end portions a perpendicular connecting strap secured at each end to each of said encircling straps, and a fastener for joining the opposite end portions of each of said encircling straps, said fastener being positioned about said opposite end portion of said body encircling member between said retaining ring and said perpendicular connecting strap, so that said fastener, when unfastened, is prevented from sliding off said one opposite end portion, said opposite end portions being adapted to overlie each other within said fastener when said harness is disposed in its mode of use on the body of an animal, each of said fasteners comprising a clevis-shaped hasp consisting of a slotted base having spaced, inverted, generally U-shaped side members disposed thereon which define a channel transverse to said base and a flanged lever rotatably seated within said U-shaped walls, said opposite end portions being insertable between said lever and said base within the channel, said flanged lever being rotatable between a first position permitting free movement of said overlying end portions and a second position in which said overlying end portions are squeezed and bent by the flange on said flanged lever to secure the opposite end portions together and said retaining ring being positioned immediately adjacent to said fastener when fastened so that compression of said opposite end portions is increased.

* * * * *